(12) United States Patent
Nutter et al.

(10) Patent No.: US 9,823,997 B2
(45) Date of Patent: Nov. 21, 2017

(54) PRODUCTION RESILIENCY TESTING SYSTEM

(71) Applicant: BANK OF AMERICA CORPORATION, Charlotte, NC (US)

(72) Inventors: Darla Jean Nutter, Minnetonka, MN (US); Matthew Emery Mabry, Troy, NC (US)

(73) Assignee: Bank of America Corporation, Charlotte, NC (US)

(*) Notice: Subject to any disclaimer, the term of this patent is extended or adjusted under 35 U.S.C. 154(b) by 233 days.

(21) Appl. No.: 14/823,754

(22) Filed: Aug. 11, 2015

(65) Prior Publication Data

US 2017/0046247 A1 Feb. 16, 2017

(51) Int. Cl.
*G06F 11/00* (2006.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC . H04L 41/5038; H04L 12/2697; H04L 43/50; H04L 67/38; H04L 69/329; H04L 12/1813; G06F 11/3692; G06F 11/273
See application file for complete search history.

(56) References Cited

U.S. PATENT DOCUMENTS

| 6,003,065 A * | 12/1999 | Yan ......................... G06F 13/10 709/200 |
| 6,018,805 A * | 1/2000 | Ma ....................... H04L 67/2819 709/230 |
| 6,859,834 B1 * | 2/2005 | Arora .................... G06F 9/5033 709/225 |

(Continued)

OTHER PUBLICATIONS

Wolf,"Supporting component-based failover units in middleware for distributed real-time and embedded systems", Aug. 10, 2010, Elsevier B.V., pp. 597-613.*

(Continued)

*Primary Examiner* — Bryce Bonzo
*Assistant Examiner* — Jeison C Arcos
(74) *Attorney, Agent, or Firm* — Michael A. Springs; Moore & Van Allen PLLC; Nicholas C. Russell

(57) ABSTRACT

The present disclosure describes testing resiliency plans for applications on alternate hosts within production environments instead of simulated environments. Embodiments herein disclose determining resiliency components for an application being tested and determining related resiliency components from related applications. Embodiments herein further disclose determining one or more dependencies between a first resiliency component and both the resiliency components from the application being tested and related applications. Furthermore, mapping resiliency component dependencies between the resiliency components of the application and with the related resiliency components is disclosed. Finally, the first resiliency component and the (Continued)

related resiliency components are moved from a home host location to an alternate host location for a period of time in a real production environment.

20 Claims, 4 Drawing Sheets

(56) References Cited

U.S. PATENT DOCUMENTS

| | | | | |
|---|---|---|---|---|
| 7,434,087 B1* | 10/2008 | Singh | ................ | G06F 11/1443 714/4.11 |
| 2003/0028579 A1* | 2/2003 | Kulkarni | ................... | G06F 8/30 718/100 |
| 2004/0128584 A1* | 7/2004 | Mandava | ............ | G06F 11/3676 714/38.14 |
| 2005/0288961 A1* | 12/2005 | Tabrizi | ................... | G06Q 10/00 717/126 |
| 2006/0036895 A1* | 2/2006 | Henrickson | ......... | G06F 11/1451 714/4.11 |
| 2006/0218446 A1* | 9/2006 | Crawford | ............ | G06F 11/3688 714/38.14 |
| 2007/0022324 A1* | 1/2007 | Chang | ................ | G06F 11/3672 714/38.14 |
| 2008/0320071 A1* | 12/2008 | Hoskins | .............. | G06F 11/3688 709/202 |
| 2009/0165133 A1* | 6/2009 | Hwang | ................... | G06F 21/53 726/22 |
| 2011/0022192 A1* | 1/2011 | Plache | ............... | G05B 19/4188 700/28 |
| 2011/0209131 A1* | 8/2011 | Hohenstein | ............... | G06F 8/65 717/168 |
| 2013/0080999 A1* | 3/2013 | Yang | ................... | G06F 11/3664 717/124 |
| 2013/0232245 A1* | 9/2013 | Antosz | ...................... | G06F 8/10 709/222 |

OTHER PUBLICATIONS

Bea, "Managing Failover", 2000, Bea, pp. 1-9.*
Kistijantoro, "Enhancing an Application Server to Support Available Components", Jul./Aug. 2008, IEEE, Transactions on Software Engineering, Vol. 34, No. 4, pp. 531-545.*
Labourey, "JBoss Clustering", Dec. 18, 2003, The JBoss Group, 6th Edition, pp. 1-97.*
Microsoft, "Chapter 19: Physical Tiers and Deployment", 2009, Microsoft.com, pp. 1-15.*
White, "Generating Test Cases for GUI Responsibilities Using Complete Interaction Sequences", 2000, IEEE, pp. 110-121.*
Kistijantoro, "Component Replication in Distributed Systems: a Case study using Enterprise Java Beans", 2003, IEEE, Proceedings of the 22nd International Symposium on Reliable Distributed Systems, pp. 1-10.*
Osinski, "Carrot2: Design of a Flexible and Efficient Web Information Retrieval Framework", 2005, Springer-Verlag, pp. 439-444.*

* cited by examiner

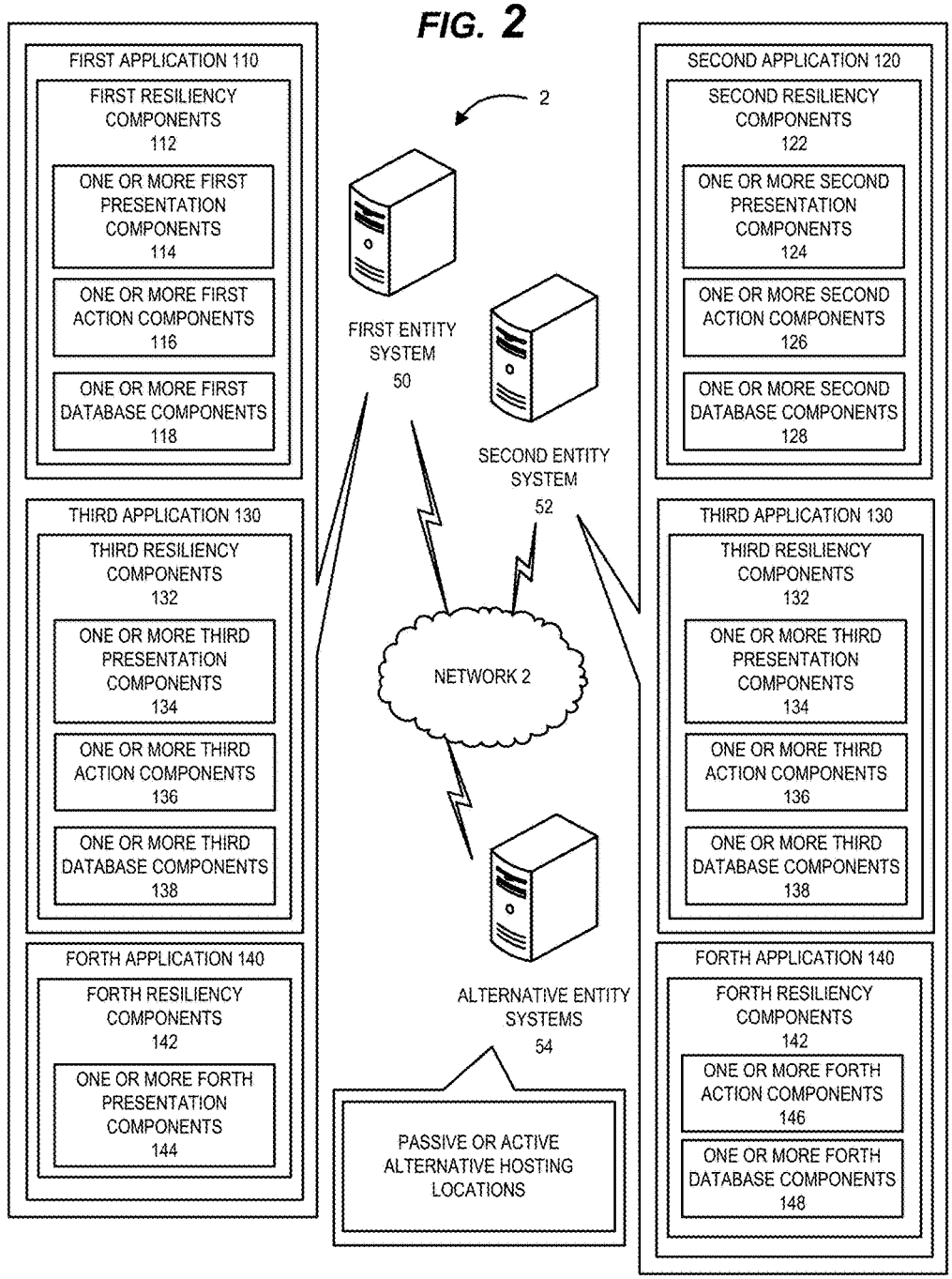

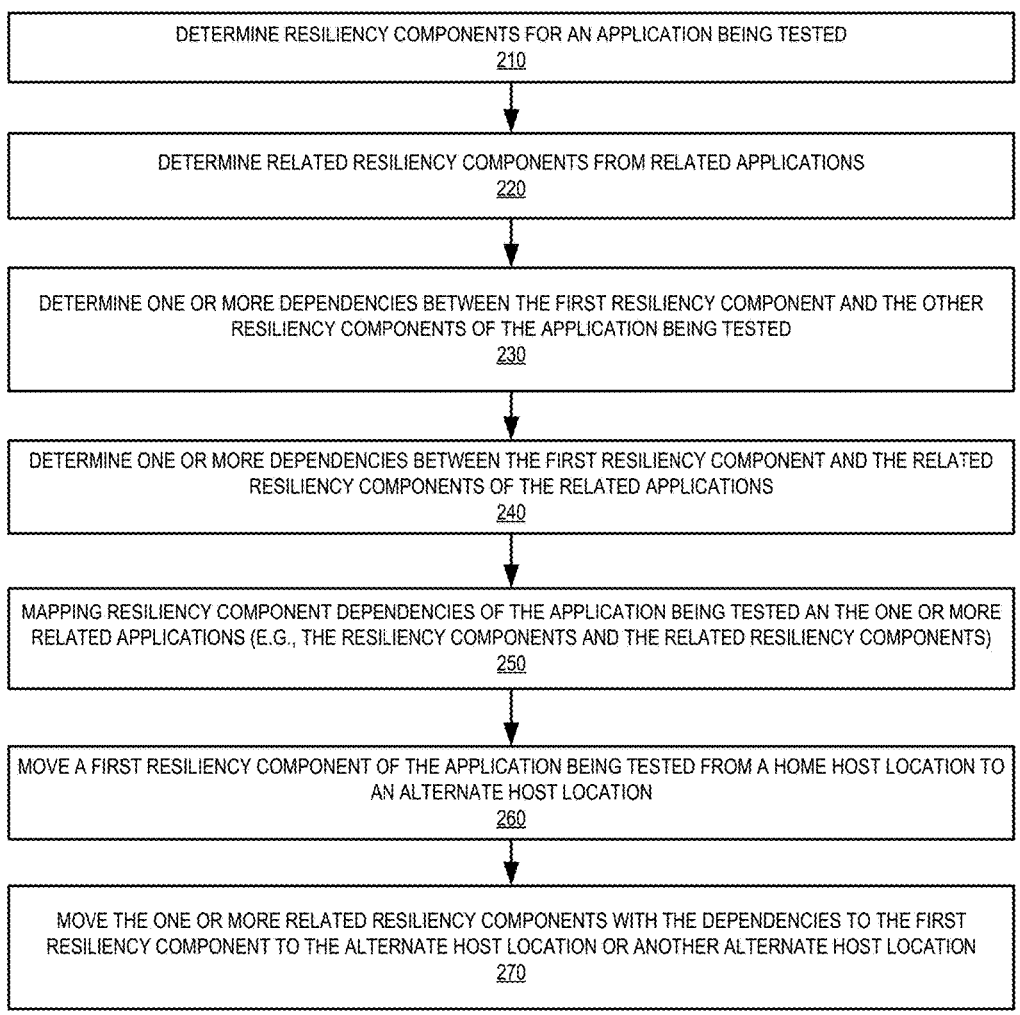

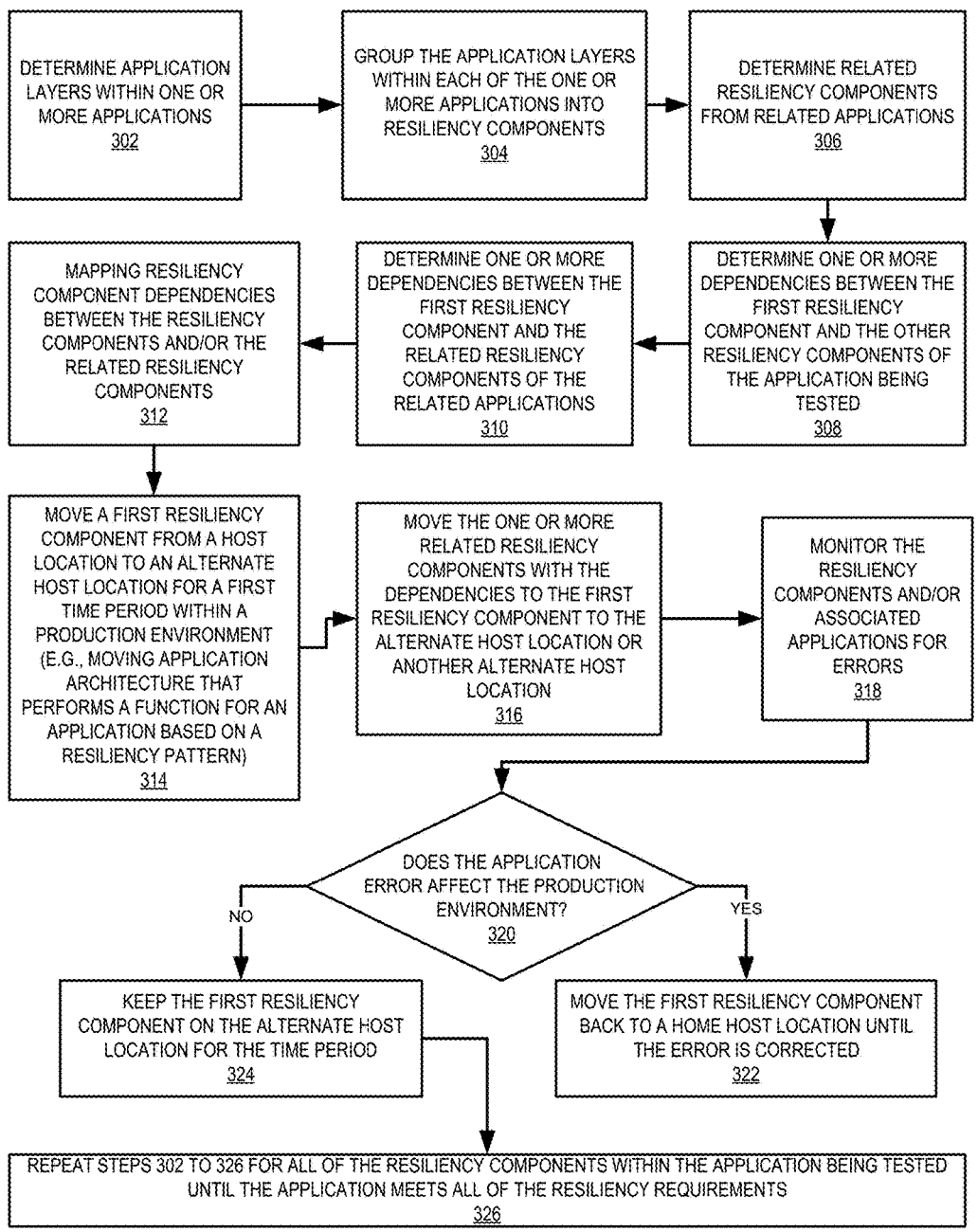

PRODUCTION RESILIENCY TESTING SYSTEM

FIELD OF THE INVENTION

This disclosure generally relates to testing resiliency plans for applications on alternate hosts within production environments instead of simulated environments.

BACKGROUND

Conventionally, contingency testing is a simulated event that is separated from a real production environment and therefore has no contribution to production operations. Additionally, testing resiliency plans is typically performed on all applications and/or systems across the entirety of a part of an enterprise application portfolio at once, which typically takes months planning and resources. Simulating a production environment can be a difficult process that involves recreating many variable factors to mimic a complex operation. Furthermore, merely simulating a production environment does not give application managers full confidence in their backup systems for the applications being tested.

SUMMARY OF INVENTION

The following presents a summary of certain embodiments of the present invention. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Methods, systems, and computer program products are described herein that provide for testing resiliency plans for applications on alternate hosts within production environments instead of simulated environments.

Some embodiments characterize a system for testing applications on alternate hosts within production environments instead of simulated environments. The system includes one or more memory devices having computer readable program code stored thereon and one or more processing devices operatively coupled to the one or more memory devices. The processing devices are configured to execute the computer readable program code to 1) determine, for an application being tested, resiliency components for the application, wherein the resiliency components are at least one or more presentation components, one or more action components, and one or more database components; and 2) determine one or more related resiliency components from one or more related applications, wherein the one or more related resiliency components are at least one or more related presentation components, one or more related action components, or one or more related database components for the one or more related applications. The processing devices are further configured to 3) determine one or more dependencies between the first resiliency component and the resiliency components from the application being tested and with the one or more related resiliency components from the one or more related applications; and 4) map resiliency component dependencies between the resiliency components of the application being tested and with the one or more related resiliency components of the one or more related applications. The processing devices are additionally configured to 5) move a first resiliency component from the resiliency components for the application being tested from a home host location to an alternate host location for a first time period in a production environment; and 6) move the resiliency components or the one or more related resiliency components with the one or more dependencies to the first resiliency component to the alternate host location or another host location.

Some embodiments feature a computer implemented method for testing resiliency plans for applications on alternate hosts within production environments instead of simulated environments. The method performs multiple steps, all via a processing device, including: 1) determining for an application being tested, resiliency components for the application, wherein the resiliency components are at least one or more presentation components, one or more action components, and one or more database components; 2) determining one or more related resiliency components from one or more related applications, wherein the one or more related resiliency components are at least one or more related presentation components, one or more related action components, or one or more related database components for the one or more related applications; and 3) determining one or more dependencies between the first resiliency component and the resiliency components from the application being tested and with the one or more related resiliency components from the one or more related applications. The method further includes 4) mapping resiliency component dependencies between the resiliency components of the application being tested and with the one or more related resiliency components of the one or more related applications. Finally, the method includes 5) moving a first resiliency component from the resiliency components for the application being tested from a home host location to an alternate host location for a first time period in a production environment and 6) moving the resiliency components or the one or more related resiliency components with the one or more dependencies to the first resiliency component to the alternate host location or another host location.

Further embodiments provide a computer program product for testing resiliency plans for applications on alternate hosts within production environments instead of simulated environments. The computer program product includes a non-transitory computer readable medium that includes computer readable instructions. The computer readable instructions include: 1) determining, for an application being tested, resiliency components for the application, wherein the resiliency components are at least one or more presentation components, one or more action components, and one or more database components; 2) determining one or more related resiliency components from one or more related applications, wherein the one or more related resiliency components are at least one or more related presentation components, one or more related action components, or one or more related database components for the one or more related applications; and 3) determining one or more dependencies between the first resiliency component and the resiliency components from the application being tested and with the one or more related resiliency components from the one or more related applications. The computer readable instructions further include 4) mapping resiliency component dependencies between the resiliency components of the application being tested and with the one or more related resiliency components of the one or more related applications. Finally, the computer readable instructions include: 5) moving a first resiliency component from the resiliency components for the application being tested from a home host location to an alternate host location for a first time period in a production environment; and 6) moving the resiliency components or the one or more related resiliency components with the one or more dependencies to the first resiliency component to the alternate host location or another host location.

Implementations may include one or more of the following features.

In some implementations, the resiliency components are determined based on: determining application layers within the application; and grouping the application layers, wherein the grouping of the application layers are grouping application architecture that performs a specific function into a resiliency component.

In some implementations, moving the first resiliency component to the alternate host comprises moving application architecture that preforms a function for the application based on a resiliency pattern.

In some implementations, the resiliency pattern defines any data center pairing for two or more data centers.

In some implementations, the resiliency pattern defines if the first resiliency component is active-active or active-passive.

In some implementations, the one or more processing devices are configured to execute the computer readable program code to: receive an indication that architecture for a resilience component has changed; determine changes in the one or more dependencies for the architecture change; and remap the resiliency component dependencies based on the architecture change.

In some implementations, the one or more processing devices are configured to execute the computer readable program code to: determine when moving the first resiliency component to the alternate host location resulted in no application errors for the first time period; and identify the first resiliency component as being compliant and move the first resiliency component to the home host location.

In some implementations, the one or more processing devices are configured to execute the computer readable program code to: determine when moving the first resiliency component to the alternate host location resulted in an application error; determine when the application error affects the production environment; and move the first resiliency component back to the home host location when the application error affects the production environment.

In some implementations, the one or more processing devices are configured to execute the computer readable program code to: determine when moving the first resiliency component to the alternate host location resulted in an application error; determine when the application error does not affect the production environment; and keep the first resiliency component on the alternate host location when the application error does not affect the production environment.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
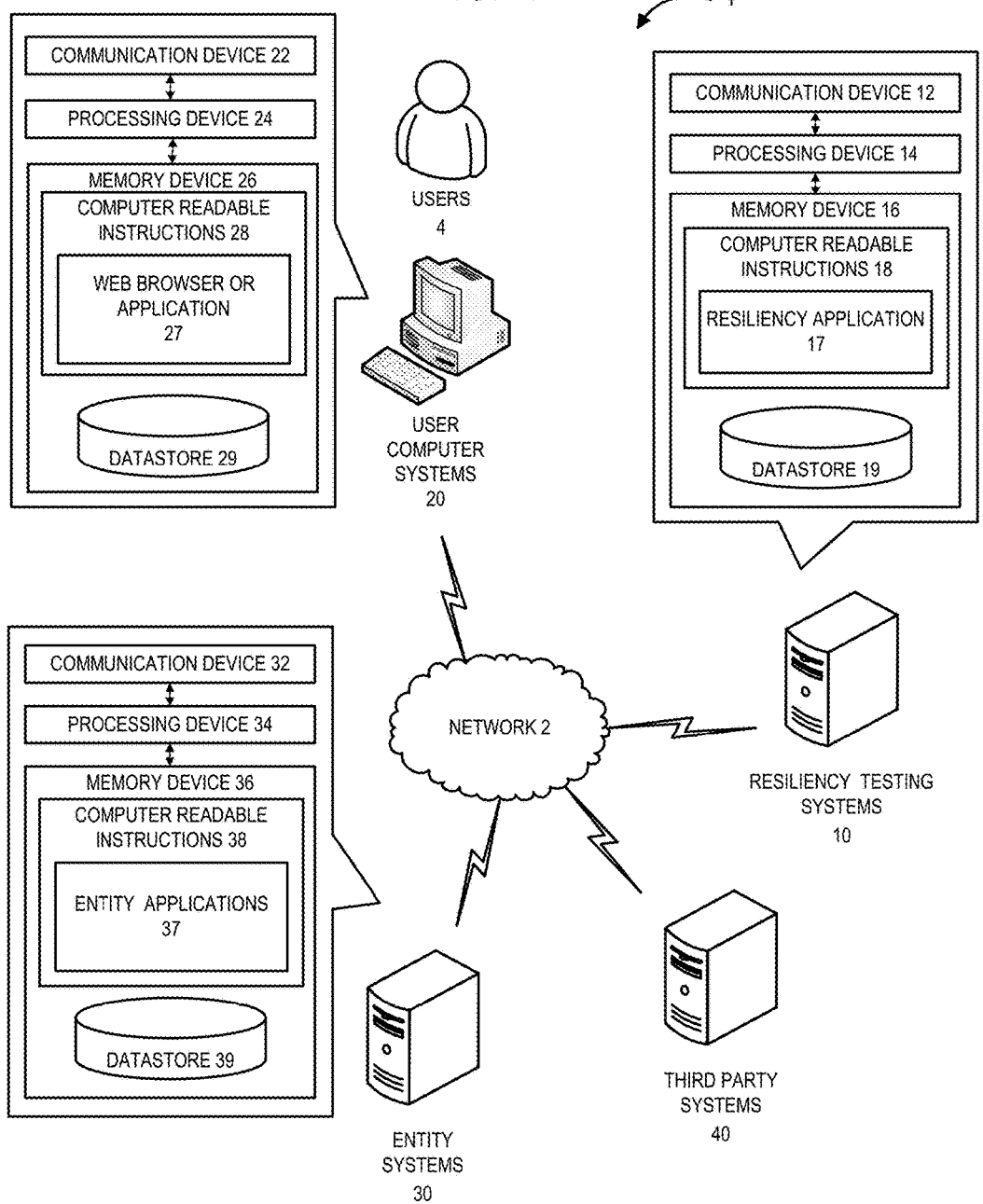

Having thus described embodiments of the invention in general terms, reference will now be made to the accompanying drawings, which are not necessarily drawn to scale, and wherein:

FIG. 1 is a block diagram illustrating a system environment for testing resiliency plans, in accordance with an embodiment of the invention;

FIG. 2 is a block diagram illustrating multiple applications each having multiple tiers performing multiple functions and corresponding to one or more resiliency components, in accordance with an embodiment of the invention;

FIG. 3 is a flowchart illustrating a high level process flow for testing resiliency plans for applications on alternate hosts within production environments instead of simulated environments, in accordance with an embodiment of the invention; and FIG. 4 is a flowchart illustrating a detailed process for testing resiliency plans for applications on alternate hosts within production environments instead of simulated environments, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, and the like and/or may not include all of the devices, components, modules and the like discussed in connection with the figures. A combination of these approaches may also be used.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blue-ray disc where disks usually reproduce data magnetically, while discs usually reproduce data optically with lasers. Combinations of the above should also be included within the scope of computer-readable media.

Thus, systems, methods, and computer program products are described herein that provide for testing resiliency plans for applications on alternate hosts within production environments instead of within simulated environments.

Some embodiments disclosed herein arise, in part, from the realization that a system can advantageously be configured to test resiliency plans for applications in real production environments instead of simulated environments so that the testing itself is part of production in operation, with full workloads to ensure continuity of the applications being utilized by the entity and the entities customers. Some embodiments disclosed herein arise, in part, from the realization that a system can advantageously be configured to test resiliency plans for applications by testing relevant components, or described herein as resiliency components, on an individual or small-scale basis, instead of testing entire applications or all applications across the entirety of an application portfolio at the same time be it in a production environment or simulated environment.

Some embodiments disclosed herein arise, in part, from the realization that a system can advantageously be configured to re-architect an application by implementing a different dependency scheme to achieve the same functionalities of the application as is originally built. Such embodiments are particularly advantageous when part or all of the dependencies of an application are difficult to determine and/or understand. The present invention clarifies the dependencies down to dependencies between resiliency components of different applications, instead of relying on dependencies between the applications themselves at high levels.

An "entity," as used herein, may refer to any organization that produces and/or provides products (e.g., goods and/or services), including companies that sell, offer for sale, distribute, trade, and/or otherwise deal in products.

As used herein, the term "resiliency component(s)," as used herein, refers to an architecture or composite of individual parts within a single application that together perform certain functions within the single application. For example, resiliency components may be broken down into components grouped between application layers, which are described below.

As used herein, the term "application layer" is a tiered structure of an application that is includes all of the layers of architecture to perform a function, including for example, but not limited to, a presentation layer having user-oriented functionality responsible for managed user interaction with the application (e.g., one or more related presentation components), a business logic layer having core functionality and business logic of the application (e.g., one or more related action components), and a data layer providing access to data utilized or stored by the application (e.g., one or more related database components). In some of the embodiments described herein, an application may additionally include a vendor component having functionality that is incorporated into the application or with which the application communicates.

In some of the embodiments described herein, each application within the entity may have different resiliency components, based upon how the application is built, and each of the resiliency components may be hosted on different servers in the same location or different locations. Resiliency components may be grouped together based on dependences within an application and outside of an application with other applications. The dependences between the resilience components may be mapped and should be fully understood so as to achieve successful resiliency plans for the entity's applications.

As used herein, the terms "resiliency testing" shall mean the resiliency and contingency testing of applications and the resiliency components thereof when the server, servers, and/or data center on which the resiliency components are located suffers an outage, such as a technical issue (e.g., system shut down), natural disaster (e.g., power outage, hurricane, tornado, flooding, or the like), system upgrade (e.g., improving the system hardware), or any other like event that would cause an application or part thereof to be hosted an on alternate location. In some embodiments herein disclosed, resiliency testing is carried out on alternate hosting locations within production environments instead of within simulated environments.

Referring now to FIG. 1, a block diagram of a system environment 1 is provided, which includes at least one resiliency testing system 10 for testing resiliency plans for applications, at least one user computer system 20 operated by a user 4, at least one entity computer system 30, and at least one third-party system 40. All these systems, are in communication with one another through a network 2.

A "system environment," as used herein, may refer to any information technology platform of an enterprise (e.g., a national, multi-national corporation, or any other large or small business) and may include a multitude of servers, machines, mainframes, personal computers, network devices, front and back end systems, database systems and/or the like that are either run by the entity or by another party for the benefit of the third party.

In some embodiments, the resiliency testing system 10 illustrated in FIG. 1 may be utilized in order to organize and run the contingency testing plans. In one embodiment, the resiliency testing system 10 stores how each of the components of the applications of the entity are broken down into resiliency components (e.g., the one or more presentation components, the one or more action components, and the one or more database components). The resiliency testing systems 30 tracks and stores the locations where each of the resiliency components are run (e.g., home host location, or an alternate host location for testing the resiliency plan), and the dependencies of each of the resiliency components within the same application or with the resiliency components of other applications. In some embodiments, the resiliency components being tested will stay in the alternate host location for an extended period of time (e.g., 45 days, or more or less depending on what meets the contingency requirements for the entity, or imposed by a government entity) in order to satisfy the resiliency plan.

As shown in FIG. 1, the resiliency testing system 10 includes at least one (e.g., one or more) communication device 12, at least one processing device 14 and at least one memory device 16. The memory device 16 includes a resiliency testing application 17 embedded in computer readable instructions 18, and a datastore 19. The communication device 12 may encompass a modem, server, one more network interface cards, ports for connection of network devices, Universal Serial Bus (USB) connectors, or other devices for communicating with other devices on the network 2.

As used herein, the term "processing device" generally includes circuitry used for implementing the communication and/or logic functions of a particular system. The processing device may include a digital signal processor device, a microprocessor device, analog-to-digital converters, digital-to-analog converters, and other support circuits. Control and signal processing functions of the processing device may be allocated between these devices according to their respective capabilities. The processing device may also include functionality to operate other software programs based on computer-executable program code portions thereof, which is stored on the system. The processing device 14 is operatively coupled to the memory device 16 and configured to execute the resiliency testing application 17.

The memory device 16 may include volatile memory, such as RAM having a cache area for the temporary storage of information. The memory device 16 may also include non-volatile memory that may be embedded and/or removable. The non-volatile memory may additionally or alternatively may include an Electrically Erasable Programmable Read-Only Memory (EEPROM), flash memory, and/or the like.

The datastore 19 may contain resiliency testing results and information and data which can be used for testing resiliency plans, including but not limited to the resiliency components of the applications used by the entity, and any dependencies between the resiliency components of the various applications. In some embodiments, the resiliency testing system 10 can be directly operated by any person or team involved in or in charge of testing resiliency plans for applications. In some embodiments, the resiliency testing system 10 is operated and/or monitored by the user 4, via the user computer system 20.

It will be understood that the resiliency testing system 10 may be configured to implement one or more of the various user interfaces and/or process flows described herein. It will also be understood that, in some embodiments, the memory device 16 includes other applications. It will also be understood that, in some embodiments, the resiliency testing system 10 is configured to communicate with third-party systems 40 for purpose of testing and/or determining the resiliency of components that interact with third-party software which may be a part of the entity's applications or may be hosted by the third-party.

The user computer system 20 can be a personal computer, electronic notebook, PDA, smartphone, tablet, laptop, or any computing device that has networking capability and is in communication with the resiliency testing system 10, and/or other systems described herein, through the network 2. As shown in FIG. 1, the user computer system 20 includes at least one communication device 22, at least one processing device 24 and at least one memory device 26 that includes computer readable instructions 28 including a web browser or application 27, and a datastore 29. The user computer system 20 is run by the user 4, and the user 4 may utilize the web browser or application 27 to access the other systems and devices over the network 2.

The user 4 may refer to any person, persons, or team, performing resiliency plan testing, for example, an employee, a data center administrator, an application team, an application manager, or a product team member of the entity. In some embodiments, the user 4 may refer to a centralized team dedicated to the resiliency testing.

The entity systems 30, in some embodiments, are the servers and systems of the entity, or the servers and systems that are controlled for the entity by another party, through which the entity operates daily business activities that are internal or external to the entity (e.g., for entity associate or for customers). As shown in FIG. 1, each of the entity systems 30 may include at least one communication device 32, at least one processing device 34 and at least one memory device 36. The memory device 36 includes computer readable instructions 38, including various entity applications 37 for performing various business functions and at least one datastore 39 containing information, data and the like required for running the business operations of the entity.

The third party system 40 can be any system controlled or operated by third parties that run applications that interface with the entity applications 37. A "third party," as used herein, refers to any entity, including companies that provide functionality or application layers outside the boundary of the entity. The third party system 40 may be a source that is outside the boundaries of the entity system 30 and hosts some functions, services or applications needed or desired by the entity for business or testing purposes. The third party system 40 may provide or host applications or application layers (e.g., databases, performing functionality requested by the entity application). The third party systems may have the same devices as previously described with respect to the resiliency testing systems 10, the user computer systems 20, and/or the entity systems (e.g., one or more communication devices, one or more processing devices, and one or more memory devices).

The resiliency testing system 10, user computer system 20, entity system 30, and third party system 40 are each operatively connected to the network 2 and in communication with one another. The network 2 may include various networking interfaces, such as a local area network (LAN), a wide area network (WAN), a global area network (GAN)

(e.g., Internet, or a hybrid thereof). The network 2 may be secure or unsecure and may also include wireless and/or wireline and/or optical interconnection technology.

In some embodiments, the resiliency testing system 10 may be utilized by a user 4 and/or run automatically to communicate with other systems in order to determine and store resiliency components for an application (for example and application that may be tested for resiliency), wherein the resiliency components may include at least one or more presentation components, one or more action components, and one or more database components, which contain all of the architecture within the application that is required to perform a function of the application. The resiliency testing system 10 may also be utilized to determine and store one or more related resiliency components from one or more related applications, wherein the one or more related resiliency components are at least one or more related presentation components, one or more related action components, or one or more related database components for the one or more related applications.

As used herein, the term "presentation component" refers to a user interface layer, a viewer layer, and/or a presentation tier of the application. Additionally, the term "action component" is interchangeable with "business logic component," and such a component encodes real-world business rules that determine how data can be created, displayed, stored, and changed within the application. This action component may comprise one or more application layers, where the applications support business functionality. Furthermore, the term "database component" is interchangeable with "data access component," and such a component provides access to data from databases along with attributes associated with the data (e.g., row, field, database, and the like, where the data was found).

In some embodiments, the resiliency testing system 10 is also configured to map resiliency component dependencies between the resiliency components of the application being tested and with the one or more related resiliency components of the one or more related applications, and to store these dependencies such that when a first resiliency component from the resiliency components for an application being tested is moved from a home host location to an alternate host location for a first time period, the dependent resiliency components that also have to move are identified.

In some embodiments, the resiliency testing system 10 may be able to determine one or more dependencies between the first resiliency component and the resiliency components from the application being tested, and with the one or more related resiliency components from the one or more related applications, automatically. Thereafter, the resiliency testing system 10 may be able to move the dependent resiliency components to the alternate host location or another host location.

In some embodiments, the resiliency testing is built upon existing proxies or methods, e.g., used in direct recovery testing, which includes steps of parsing out the unique identifier (ID) of each of the applications, loading the ID and running each of the applications individually and collectively to determine if the applications failover successfully. In some embodiments, the testing can be performed by any person or team associated with the applications to be tested. Yet, in other embodiments, the testing is conducted by a centralized team that is dedicated to the testing.

In some embodiments disclosed herein, resiliency testing is conducted within the production environments of the applications being tested, which tests the backup resiliency plans for the applications (or resiliency components thereof) as part of the normal operation of the business. In such embodiments, full production workloads can continue to operate when a resiliency component, and the dependent resiliency components, are shifted from a primary or home hosting location to the alternate hosting location, such that a normal business routine can continue without being interrupted by the testing. For example, in an active-active data center pairing, resiliency component workloads can be shifted from at least one data center and spread out to the remaining active data centers. In an active-passive data center pairing, the resiliency component workloads can be moved from one data center to a standby data center, bringing the standby data center into a live production state for the tested resiliency component.

The structure of the resiliency components, and the processes and systems for implementing the present the present invention will be described in more detail with respect to FIGS. 2-4.

FIG. 2 is a block diagram illustrating various applications each having multiple tiers performing multiple functions, and each function corresponding to one or more resiliency components, in accordance with some embodiments of the invention. It should be understood that FIG. 2 illustrates a very simple example of how applications may be broken down into various resiliency components and stored on different host entity systems in order to achieve the benefits of the present invention that allow for improved resiliency testing of applications.

As shown in FIG. 2, each application has been broken down into multiple application layers and architecture, which has been grouped into one or more resiliency components, and the one or more resiliency components correspond to one or more functional components of the application or application. For example, a first application 110 has one or more first resiliency components 112, which are defined as one or more first presentation components 114, one or more first action components 116, and one or more first database components 118. A second application 120 has one or more second resiliency components 122, which are defined as one or more second presentation components 124, one or more second action components 126, and one or more second database components 128. As illustrated in FIG. 2 the resiliency components for the first application 110 may be have home host location on a first entity system 50, while the resiliency components for the second application 120 may have a home host location on a second entity system 52. The hosting locations of these applications may have been previously determined in order to improve the processing times of these applications.

Moreover, in some embodiments, multiple applications can be logically grouped together and stored in one entity system. For example, as shown in FIG. 2, a third application 130 may have one or more third resiliency components 132, which are defined as one or more third presentation components 134, one or more third action components 136, and one or more third database components 138. Some of the resiliency components may be run on two different entity systems (e.g., because some resiliency components have dependencies with the first application 110, while some have dependencies with the second application 120). Other resiliency components may have duplicate resiliency components that run on two different entity systems (e.g., to increase runtime speeds for applications using third application 130). As such the third application 130 may have components that have a home host location on both the first entity system 50 and the second entity system 52.

In some embodiments a fourth application 140 may have one or more fourth resiliency components 142, which are defined as one or more fourth presentation components 144, one or more fourth action components 146, and one or more fourth database components 148. In some environments different parts of the resiliency components may have a home host location on different entity systems (e.g., first entity system 50 and second entity system 52). For example, the fourth presentation components 144 may be hosted on the first entity system 50 because they required faster processing times to display what is needed to the user, while the fourth database components 148 are hosted on the second entity system 54 because storing information for the fourth application 140 does not require processing times as fast as the fourth presentation components 144. It should be understood that breaking the applications up into resiliency components not only improves the resiliency testing of the applications, but also improves on the processing speeds in running the applications because the locations at which the resiliency components may be stored can be changed in order to increase or decrease processing speeds and times based on functionality of the resiliency components.

It should be further understood that not all applications will have all three of these types of resiliency components. For example, a database application may only function as a database, or a presentation application may simply access information from other applications and display it to a user. As such, it should be understood that these resiliency components discussed herein do not have to be in each application, and/or there may be other types of resiliency components that could be included in an application.

During testing instead of moving the entire applications from the first entity system 50 and/or second entity system 52 to an alternate system 54 (which may be a passive system or another active system that has space to accept the entire application) in a virtual environment, only the resiliency components being tested are moved to the alternate entity systems 54. During the virtual testing the entire application would be moved and tested on the alternate entity system 54 outside of production times (e.g., on weekends, nights, or other times) when the applications were not being used or when usage volumes were low. As such, the virtual testing of these applications did not run during periods of production and/or peak use, which did not accurately test the performance of the application in the case of an outage of the home host location. As such, past resiliency testing has not provided the desired conference that during an outage the alternate hosting location would be able to allow the application to function (e.g., at peak times of use). Moreover, the planning and resources needed to move an application and all of its dependencies takes months, whereas moving the just the resiliency components of a single application takes much less time. Moreover, running the resiliency components during a production environment (e.g., during peak usage times, or the like) provides a more accurate testing environment.

In some cases, each test of the resiliency component can pass or fail independently of any other resiliency components, such that each resiliency or functional component can be tested separately. Moreover, mapping out an application's dependencies at its resiliency component level, provides greater insight into resiliency plans for the alternate host sites, and allows easier identification of application errors, should any occur during the resiliency testing. In some embodiments, multiple resiliency components corresponding to an application or applications may be tested individually or collectively.

For example, instead of testing a single application once a year within a single virtual test, the resiliency components of the application can be tested in a rolling test (e.g., different resiliency components are tested as different times) until all of the resiliency components have been tested and operated in the alternate hosting location for a period of time which provides a more accurate idea of how the resiliency components will function during a real outage, such as a technical outage (e.g., system shut down), natural disaster (e.g., power outage, hurricane, tornado, flooding, explosion, or the like), system upgrade (e.g., improving the system hardware), or the like. After all of the resiliency components of an application have been tested, the application may be determined to have passed resiliency testing with a greater degree of confidence. The processes for performing the testing are described in further detail below generally with respect to FIG. 3 and more specifically with respect to FIG. 4.

FIG. 3 illustrates a high level process flow 200 for testing resiliency plans for applications on alternate hosts within production environments instead of simulated environments, in accordance with an embodiment of the present invention. In some embodiments, the process 200 is executed by a user 4 utilizing the resiliency testing system 10 to change the home hosting location of one or more resiliency components of an application to an alternate hosting location.

The process 200 includes multiple steps, which may all be performed via a processing device controlled by a user 4 (e.g., person, persons, or a team in charge of testing resiliency plans). The process 200 begins with block 210, when an application is broken down into resiliency components. As illustrated by block 220 related applications are determined and the resiliency components for those applications are determined. Block 230 illustrates that any dependences for the first resiliency component with the other resiliency components within the same application are determined. Additionally, as illustrated by block 240 any dependences for the first resiliency component and other resiliency components within other applications are determined. Block 250 illustrates that the resiliency component dependencies are mapped between the application being tested and all of the related applications. As illustrated by block 260 a first resiliency component of the application being tested is moved from a home host location to an alternate host location. Block 270 illustrates that the dependent resiliency components of the first resiliency components are moved along with the first resiliency component in order to perform the resiliency testing for the period of time within a production environment.

Turning now to FIG. 4, a detailed process flow 300 is provided for testing resiliency plans for applications on alternate host locations within production environments instead of simulated environments. Block 302 illustrates that application layers are determined within one or more applications. As described above, application layers are the different parts of the application (e.g., architecture, and the like) that are needed in order for the application to configure the interfaces for presentation to the user, takes the actions that the application can perform, and store the information that is used by the application.

After the application layers are determined, block 304 illustrates that the application layers are grouped together into resiliency components that include all of the architecture within the application layers necessary to perform the functions of the application, including but not limited to the presentation components, the action components, and the database components previously described above. For example, the resiliency components may be grouped as illustrated in FIG. 2 for each of the applications within the entity systems.

Block 306 illustrates that the dependencies for each of the resiliency components are determined for any related applications. These related resiliency components from other applications may be determined because the functions of some applications may be dependent on accessing the functions of the same application or other applications. In some situations, if an application cannot access a database, it cannot present the information to the customer in time, and thus when the presentation component is moved to another host location the database component within the same application or another application must be moved to the same alternate host location or another host location in order for the presentation component to work properly. For example, as illustrated in FIG. 2 there may be dependencies between the resiliency components of the first application 110, the third application 130, the forth application 140 all within the first entity system 50. Alternatively, or in addition to dependencies within the same application, or between applications on the same entity system, there may also be dependencies between one or more of the resiliency components of the first application 110 and the second application 120, the third application 130, and/or forth application 140 that are located on the second entity system 52. The dependencies between the resiliency components may be saved within the resiliency application 17 of the resiliency testing systems 10 in order to determine what components to move to alternate host locations.

The process 300 then continues on to block 308 to determine the dependencies associated with the first resiliency component that has been selected for testing. In some embodiments, every resiliency component of the resiliency component of the application being tested may have a dependency with the first resiliency component being moved to the alternate hosting location. In such an embodiment, the system may require that every resiliency component within the application be moved to the alternate hosting location for the testing period. In some embodiments, there are no other resiliency components within the application that have dependencies with the first resiliency component, and the first resiliency component will therefore not be paired with any other resiliency components within its own application.

As illustrated by block 310, the process 300 then determines dependencies between the first resiliency component and the related resiliency components of any related applications. This is a similar block step 308, but instead of searching for dependencies within the application to which the first resiliency component belongs, the system analyzes resiliency components of all other applications that may be related to the first resiliency component being tested. The dependencies may be determined from the mapping discussed previously in block 312.

Block 312 illustrates that all of the dependencies of the resiliency components with the entity are mapped out and saved within the resiliency application 17. As such, for example any dependences between any of the resiliency components illustrated in FIG. 2 may be determined, linked to one another, and saved within the resiliency testing system, such that when any resiliency components are being tested and/or new applications are being added or updated the dependencies of the applications are captured and saved for resiliency testing.

Upon mapping, the process 300 progresses to block 314 which illustrates that a selection may be made to test a first resiliency component. In some embodiments a user 4 may select (for example through the resiliency testing systems 10) the resiliency components that the user 4 would like to test. For example, as illustrated in FIG. 2 the user may select the one or more first presentation components 114 from the first application of the first entity system 50 for testing. In other embodiments the system itself may select for testing different resiliency components on a rolling basis. For example, the system will test every resiliency component within an application to ensure complete compliance with backup protocol, and therefore will determine which resiliency component to test based on a list of resiliency components yet to have been tested. In some embodiments, the system or user 4 may test less-vital resiliency components less frequently than more-vital resiliency components. For example, less-vital resiliency components may be tested at least once for every first time period and more-vital resiliency components may be tested at least once for every second time period, where the second time period is shorter than the first time period. Additionally, the system may determine a resiliency component to test based on the occurrence of an event. Such an event may be an acquisition of a new application related to or dependent upon the application of the resiliency component. In this manner, the system can test the resiliency component (and therefore components of the whole application) upon the introduction of new factors, such as new or updated applications. The system may also determine a resiliency component to test based on the divestiture of another application or a component of that other application for the same purposes. Regardless of how a resiliency component is selected for testing, after being selected the first resiliency component of the application being tested is moved from its home host location to an alternate host location for a first time period.

To clarify, this Step 314 of moving a first resiliency component from a host location to an alternate host location does not include moving an application component from a production environment into a simulated, non-production environment. The new location is not a typical "testing" environment where virtual parameters are created and manipulated to determine whether the application can operate effectively in its backup environment. Instead, the first resiliency component remains in a live production environment, but is now operating through an alternate host location. The alternate host location may be the normal backup server for the application (e.g., in an active-passive, or active-active data center pairing), but this backup server is brought into a live, production environment. Moreover, the resiliency component runs on the alternate host location for a period of time in which it will cycle through most or all of the issues that could occur during production in order to more thoroughly test the resiliency component.

In an active-active data center pairing, the resiliency component being tested may reside on both a first server and a second server. In such an embodiment, the act of moving the first resiliency component from a host location to an alternate host location may comprise moving the entirety of the first resiliency component from the first server to the second server, thereby increasing the workload of the second server and decreasing the workload of the first server. In some such active-active embodiments, the first resiliency component would need to be tested on each of the first and the second server separately to ensure that the resiliency component is prepared for an event where it may no longer operate out of one or more of its normal servers. Alternatively, the active-passive data center pairing, the resiliency component will operate in a new site or new sever within a site that was not previously operating, and its only task is to act as a backup sever for the application or component thereof.

Upon determination of all the dependencies underlying all the resiliency components required for the resiliency component of the application to perform certain function or functions, the process 300 advances to block 316 in which all the one or more related resiliency components determined in Steps 308-310 are moved to the alternate host location(s) (e.g., a single host location or multiple host locations) for a period of time. In some embodiments, block 316 runs simultaneously with block 314, such that the first resiliency component and the related resiliency components each move to their respective alternate host locations at the same time. In some embodiments, the alternate systems (e.g., failover servers) for the related resiliency components are the same as the first resiliency component, and therefore the related resiliency components are moved to the same alternate host location for testing. Of course, this alternate host location still runs in a production environment, processing live data, so moving the related resiliency components to the alternate host location gives a more complete testing environment for the backup system than moving the first resiliency component alone. In some embodiments, one or more of the related resiliency components have a different backup server, and therefore must be moved to another alternate host location. Returning to the simple example illustrated by FIG. 2 all of the resiliency components that have dependencies with the one or more presentation components 114 will be moved to one of the alternate entity systems 54 for testing.

In some embodiments, each of the related resiliency components will be moved to their respective alternate host locations concurrently. In such a concurrent failover, the system may test how the alternate host locations handle the new or increased workload from the first resiliency component and all of the related resiliency components. In some embodiments, each of the related resiliency components will be moved to their respective alternate host locations consecutively. In such a consecutive failover, the system may be able to test each dependency of the first resiliency component, one at a time. Of course, the system may also use combinations of concurrent and consecutive failovers by testing each related resiliency component in its failover state individually and collectively, or by testing multiple related resiliency components at a time.

In some embodiments, as illustrated by block 318 the resiliency components and associated applications are monitored in order to determine when moving the first resiliency component and the related resiliency components results in an application error for the application associated with the first resiliency components and/or the applications for the related dependent resiliency components. In some embodiments, this includes scanning every application in the system to determine whether the applications are functioning at an appropriate level. In some embodiments, this involves prompting application managers or system analysts to report on the functionality of the applications to determine if moving the first resiliency component and any related resiliency components affected individual applications or the overall system.

The process 300 then moves to block 320 to determine whether the application error affects the production environment of the application for which the resiliency component is being tested and/or the system as a whole. As used for block 320, the term "affect the production environment" means that the application error causes a substantial decrease in functionality of the application associated with the first resiliency component to a functionality level that is below a predetermined functionality threshold. Therefore, the application error may cause changes to the production environment of the application, but will not be considered to have truly affected the production environment unless the application error causes the application to be practically inoperative.

If an application error is determined to affect the production environment, the process 300 moves to block 322 in which the first resiliency component and the dependent resiliency components are moved back to the home host locations until the basis of the application error is determined and corrected. Block 322 may occur very quickly in some embodiments to reduce, limit, or prevent any significant change to the production environment of the application being tested or the system as a whole. This may be important because the testing environment under this process 300 is a production environment, so actual live data is being processed.

Block 322 may be accompanied by the system sending a notification to a user 4, such as an application manager, analyst, or other user, alerting a user 4 that the resiliency plan for the first resiliency component must be changed to become compliant. This notification may also provide information about the first resiliency component, the host location, the alternate host location, the related resiliency components, the time of the move to the alternate host location, the workload of the alternate host location, and any other information that a user, such as an application manager or analyst may utilize to determine how to adjust the resiliency plan.

If the system or user 4 determines at block 320 that the application error does not affect the production environment, then the process may move block 324 where the system keeps the first resiliency component and any related resiliency components on their respective alternate host locations for a certain time period (e.g., the application will continue to work on an alternate host location within a production environment). As discussed above, the alternative host locations are still operating in a live, production environment so the fact that the resiliency components are now located on alternate host location for an extended period of time shows their ability to operate appropriately in their backup configuration, thus passing the resiliency testing. In some embodiments, the system may monitor the resiliency components on the alternate host locations for the entire time period by periodically checking for any application errors. In some embodiments, the system monitors the resiliency components on the alternate host locations for the entire time period by continuously checking for any application errors in real-time or near real-time to ensure that the system is ready to catch any significant changes to the production environment and take the appropriate steps (including as described with respect to block 322) to remedy any changes.

In some embodiments, Step 324 includes notifying an application manager and/or an application team associated with the application that contains the first resiliency component of the application error. This may allow the application manager and/or the application team to address and remedy the application error while the first resiliency component is still in its backup environment. For example, the system may determine that an error associated with the first resiliency component running on its alternative host location decreases the functionality of the production environment of the overall application associated with the first resiliency component to a minor extent. Because the overall application can still function at an acceptable level, the system will keep the first resiliency component, and its related resiliency components, on the alternative host location(s) and notify the application managers of minor application error so this error can be remedied before the functionality of the overall application drops below the acceptable level. In some embodiments, the system may run the process 300 at decision step 320 more frequently upon a determination that the application error may eventually cause a significant change in the production environment of the application.

In some embodiments, the system may periodically check for application errors based on a triggering event, such as determining any significant change to the structure, workload, or other factor that may affect the application being tested or the system as a whole. For example, the system may detect that a new application has been added to the overall system during the time period. The acquisition of a new application may affect the resiliency component being tested, so the system may look for application errors to ensure that the first resiliency component and any application error does not affect the production environment.

Finally, the process 300 moves to block 326, where the system repeats steps 314 to 324 for all of the resiliency components within the applications of the entity until the applications meet all of the resiliency requirements. In some embodiments, this entails testing every single resiliency component of the applications being tested until every single resiliency component passes the resiliency test. In other embodiments, only resiliency components deemed to be vital are tested. In some embodiments, each resiliency component is tested one at a time in its failover mode. This configuration allows the system to check each resiliency component, and it related resiliency components on an individual basis.

While this block 326 describes the process 300 as repeating the steps to test each resiliency component, it should be noted that the system may also run these steps concurrently, testing each resiliency component on its alternate host location at the same time. For example, the system may move all of the resiliency components associated with the system to their respective alternate host locations at one time, whereby the system runs the process 300 from steps 314 to 324 for each resiliency component simultaneously. In another embodiment, the system may run these steps 314 to 324 concurrently for several sets of multiple resiliency components. Any combination of concurrent and consecutive failovers of the resiliency components of the system (and therefore iterations and combinations of the process 300 steps 314 to 324) may be used in this system.

By testing each resiliency component of an application in its actual backup configuration while still in a live environment, if a backup event were to occur, the process 300 described above will provide a robust test of the application. Additionally, application managers will have a higher level of confidence in their resiliency plan because the application managers will know that their applications are capable of maintaining their appropriate level of operation while in backup mode. This increased confidence for the application managers will help ensure that application managers will be more inclined to switch to the resiliency plan upon a notification that the original host location of the application may be significantly affected, thus protecting the application and the system as a whole from potential issues.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for testing resiliency plans for applications on alternate hosts within production environments instead of simulated environments, the system comprising:
   one or more memory devices having computer readable program code stored thereon; and
   one or more processing devices operatively coupled to the one or more memory devices, wherein the one or more processing devices are configured to execute the computer readable program code to:
   determine resiliency components for an application being tested, wherein the resiliency components for the application being tested are at least one or more presentation components, one or more action components, and one or more database components;
   determine related resiliency components from one or more related applications, wherein the one or more related resiliency components for the one or more related applications are at least one or more related presentation components, one or more related action components, or one or more related database components for the one or more related applications;
   identify a first resiliency component of the resiliency components for the application being tested;
   determine one or more resiliency component dependencies associated with the first resiliency component, wherein the one or more resiliency component dependencies are dependencies between (i) the first resiliency component and one or more other resiliency components of the resiliency components from the application being tested and (ii) the first resiliency component and one or more of the related resiliency components from the one or more related applications;
   map the one or more resiliency component dependencies associated with the first resiliency component and store the mapped one or more resiliency component dependencies associated with the first resiliency component in an application database;

move the first resiliency component from a home host location to an alternate host location for a first time period in a production environment; and in response to moving the first resiliency component, move the mapped one or more resiliency component dependencies associated with the first resiliency component to the alternate host location or another host location for the first time period in the production environment.

2. The system of claim 1, wherein the resiliency components for the application being tested are determined based on:

determining application layers within the application being tested; and grouping the determined application layers, wherein the grouping of the determined application layers comprises grouping application architecture that performs a specific function into a single resiliency component.

3. The system of claim 1, wherein moving the first resiliency component from the home host location to the alternate host location comprises moving application architecture that preforms a function for the application being tested based on a resiliency pattern, wherein the application architecture is associated with the first resiliency component.

4. The system of claim 3, wherein the resiliency pattern defines any data center pairing for two or more data centers.

5. The system of claim 3, wherein the resiliency pattern defines if the first resiliency component is active-active or active-passive.

6. The system of claim 1, wherein the one or more processing devices are configured to execute the computer readable program code to:

receive an indication that an architecture change for a second resiliency component has occurred, wherein the second resiliency component is one of the resiliency components for the application being tested or one of the related resiliency components from the one or more related applications;

in response to receiving the indication that the architecture change for the second resiliency component has occurred, determine changes in the one or more resiliency component dependencies associated with the first resiliency component; and remap the one or more resiliency component dependencies associated with the first resiliency component based on the determined changes in the one or more resiliency component dependencies associated with the first resiliency component.

7. The system of claim 1, wherein the one or more processing devices are configured to execute the computer readable program code to:

determine that moving the first resiliency component from the home host location to the alternate host location resulted in no application errors for the first time period; and identify the first resiliency component as being compliant and move the first resiliency component back to the home host location.

8. The system of claim 1, wherein the one or more processing devices are configured to execute the computer readable program code to:

determine that moving the first resiliency component from the home host location to the alternate host location resulted in an application error;

determine that the application error affects the production environment; and move the first resiliency component back to the home host location in response to determining that the application error affects the production environment.

9. The system of claim 1, wherein the one or more processing devices are configured to execute the computer readable program code to:

determine that moving the first resiliency component from the home host location to the alternate host location resulted in an application error;

determine that the application error does not affect the production environment; and keep the first resiliency component on the alternate host location in response to determining that the application error does not affect the production environment.

10. A computer program product for testing resiliency plans for applications on alternate hosts within production environments instead of simulated environments, the computer program product comprising a non-transitory computer readable medium comprising computer readable instructions, the instructions comprising instructions for:

determining resiliency components for an application being tested, wherein the resiliency components for the application being tested are at least one or more presentation components, one or more action components, and one or more database components;

determining related resiliency components from one or more related applications, wherein the one or more related resiliency components for the one or more related applications are at least one or more related presentation components, one or more related action components, or one or more related database components for the one or more related applications;

identifying a first resiliency component of the resiliency components for the application being tested;

determining one or more resiliency component dependencies associated with the first resiliency component, wherein the one or more resiliency component dependencies are dependencies between (i) the first resiliency component and one or more other resiliency components of the resiliency components from the application being tested and (ii) the first resiliency component and one or more of the related resiliency components from the one or more related applications;

mapping the one or more resiliency component dependencies associated with the first resiliency component and storing the mapped one or more resiliency component dependencies associated with the first resiliency component in an application database;

moving the first resiliency component from a home host location to an alternate host location for a first time period in a production environment; and in response to moving the first resiliency component, moving the mapped one or more resiliency component dependencies associated with the first resiliency component to the alternate host location or another host location for the first time period in the production environment.

11. The computer program product of claim 10, wherein the computer readable instructions further comprise instructions for:

determining that moving the first resiliency component from the home host location to the alternate host location resulted in no application errors for the first time period; and identifying the first resiliency component as being compliant and move the first resiliency component back to the home host location.

12. The computer program product of claim 10, wherein the computer readable instructions further comprise instructions for:
- determining that moving the first resiliency component from the home host location to the alternate host location resulted in an application error;
- determining that the application error affects the production environment; and
- moving the first resiliency component back to the home host location in response to determining that the application error affects the production environment.

13. The computer program product of claim 10, wherein the computer readable instructions further comprise instructions for:
- determining that moving the first resiliency component from the home host location to the alternate host location resulted in an application error;
- determining that the application error does not affect the production environment; and
- keeping the first resiliency component on the alternate host location in response to determining that the application error does not affect the production environment.

14. A computer implemented method for testing resiliency plans for applications on alternate hosts within production environments instead of simulated environments, said computer implemented method comprising:
- determining, via a processing device, resiliency components for an application being tested, wherein the resiliency components for the application being tested are at least one or more presentation components, one or more action components, and one or more database components;
- determining, via a processing device, related resiliency components from one or more related applications, wherein the one or more related resiliency components for the one or more related applications are at least one or more related presentation components, one or more related action components, or one or more related database components for the one or more related applications;
- identifying, via a processing device, a first resiliency component of the resiliency components for the application being tested;
- determining, via a processing device, one or more resiliency component dependencies associated with the first resiliency component, wherein the one or more resiliency component dependencies are dependencies between (i) the first resiliency component and one or more other resiliency components of the resiliency components from the application being tested and (ii) the first resiliency component and one or more of the related resiliency components from the one or more related applications;
- mapping, via a processing device, the one or more resiliency component dependencies associated with the first resiliency component and storing the mapped one or more resiliency component dependencies associated with the first resiliency component in an application database;
- moving, via a processing device, the first resiliency component from a home host location to an alternate host location for a first time period in a production environment; and
- in response to moving the first resiliency component moving, via a processing device, the mapped one or more resiliency component dependencies associated with the first resiliency component to the alternate host location or another host location for the first time period in the production environment.

15. The computer implemented method of claim 14, wherein determining the resiliency components for the application being tested comprises:
- determining application layers within the application being tested; and
- grouping the determined application layers, wherein the grouping of the determined application layers comprises grouping application architecture that performs a specific function into a single resiliency component.

16. The computer implemented method of claim 14, wherein moving the first resiliency component from the home host location to the alternate host location comprises moving application architecture that preforms a function for the application being tested based on a resiliency pattern, wherein the application architecture is associated with the first resiliency component.

17. The computer implemented method of claim 14 further comprising:
- receiving an indication that an architecture change for a second resiliency component has occurred, wherein the second resiliency component is one of the resiliency components for the application being tested or one of the related resiliency components from the one or more related applications;
- in response to receiving the indication that the architecture change for the second resiliency component has occurred, determining changes in the one or more resiliency component dependencies associated with the first resiliency component; and
- remapping the one or more resiliency component dependencies associated with the first resiliency component based on the determined changes in the one or more resiliency component dependencies associated with the first resiliency component.

18. The computer implemented method of claim 14 further comprising:
- determining that moving the first resiliency component from the home host location to the alternate host location resulted in no application errors for the first time period; and
- identifying the first resiliency component as being compliant and move the first resiliency component back to the home host location.

19. The computer implemented method of claim 14 further comprising:
- determining that moving the first resiliency component from the home host location to the alternate host location resulted in an application error;
- determining that the application error affects the production environment; and
- moving the first resiliency component back to the home host location in response to determining that the application error affects the production environment.

20. The computer implemented method of claim 14 further comprising:
- determining that moving the first resiliency component from the home host location to the alternate host location resulted in an application error;
- determining that the application error does not affect the production environment; and
- keeping the first resiliency component on the alternate host location in response to determining that the application error does not affect the production environment.

* * * * *